(12) United States Patent
Summers

(10) Patent No.: US 9,264,284 B2
(45) Date of Patent: Feb. 16, 2016

(54) VIRTUAL DESKTOP ACCESS USING WIRELESS DEVICES

(71) Applicant: Citrix Systems, Inc., Fort Lauderdale, FL (US)

(72) Inventor: Jacob Jared Summers, Coral Springs, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 404 days.

(21) Appl. No.: 13/732,905

(22) Filed: Jan. 2, 2013

(65) Prior Publication Data

US 2014/0189138 A1 Jul. 3, 2014

(51) Int. Cl.
*H04L 29/06* (2006.01)
*H04L 29/08* (2006.01)
*G06F 13/38* (2006.01)

(52) U.S. Cl.
CPC .............. *H04L 29/06* (2013.01); *G06F 13/385* (2013.01); *H04L 67/2876* (2013.01); *H04L 69/08* (2013.01)

(58) Field of Classification Search
CPC . H04L 19/06; H04L 67/2814; H04L 67/2876; H04L 69/08; G06F 13/385
See application file for complete search history.

(56) References Cited

U.S. PATENT DOCUMENTS

| | | | | |
|---|---|---|---|---|
| 2002/0159419 | A1* | 10/2002 | Morris | 370/338 |
| 2003/0083013 | A1* | 5/2003 | Mowery et al. | 455/41 |
| 2006/0039355 | A1* | 2/2006 | Rao et al. | 370/352 |
| 2006/0123129 | A1* | 6/2006 | Toebes et al. | 709/230 |
| 2009/0150550 | A1* | 6/2009 | Barreto et al. | 709/228 |
| 2011/0010753 | A1* | 1/2011 | Hagg et al. | 726/1 |
| 2012/0302169 | A1* | 11/2012 | Lin et al. | 455/41.3 |
| 2013/0262708 | A1* | 10/2013 | McLeod | 710/2 |

FOREIGN PATENT DOCUMENTS

| | | |
|---|---|---|
| EP | 2075991 A1 | 7/2009 |
| WO | 2012083423 A1 | 6/2012 |

OTHER PUBLICATIONS

International Search Report and Written Opinion issued in related PCT/US2013/077670, Mar. 31, 2014.
Universal Serial Bus [online] [retrieved on Jan. 2, 2013]. Retrieved from the Internet<URL: http://en.wikipedia.org/wiki/Universal_Serial_Bus#Communication> [pp. 22-27].
Universal Serial Bus [online] [retrieved on Jan. 12, 2013]. Retrieved from the Internet<URL: http://en.wikipedia.org/wiki/Universal_Serial_Bus#Cabling> [pp. 15-16].

* cited by examiner

*Primary Examiner* — Michael C Lai
(74) *Attorney, Agent, or Firm* — Banner & Witcoff, Ltd.

(57) ABSTRACT

Aspects herein describe at least a method, system, and computer readable storage media for transmitting data from a first computing device to a second computing device. The first computing device comprises a host while the second computing device comprises a thin client for receiving a virtual desktop session. In one embodiment, the method comprises generating one or more Bluetooth packets associated with a Bluetooth application. The Bluetooth application is executed by a processor of the first computing device. The method further comprises transmitting the generated Bluetooth packets using an ICA (independent computing architecture) protocol from the first computing device to the second computing device. The Bluetooth packets are translated into USB packets at the second computing device and transmitted to a Bluetooth device that is communicatively coupled to the second computing device.

20 Claims, 6 Drawing Sheets

VIRTUAL DESKTOP ACCESS USING WIRELESS DEVICES

FIELD

Generally, aspects described herein relate to computers, software, and networking. More specifically, aspects described herein relate to the transmission of data from a host to one or more wireless devices that are communicatively coupled to a client.

BACKGROUND

The use of desktop virtualization solutions can provide on-demand services to any user who uses a computing device. The user may have access to virtually any desktop application running on any operating system. The desktop application may be implemented at a centralized server and transmitted to a number of clients. As a consequence, a user may be able to remotely access a desired application from a centralized server by way of using his client computing device.

Smart phones, tablets, and other wireless devices have the capability of communicating with other devices using a wireless protocols. For example, when networking over a wireless connection, Bluetooth technology may be used. A client computing device may be able to communicate with wireless devices using a wireless protocol, such as Bluetooth, for example, when an adapter, such as a Bluetooth dongle, is connected to the computing device's USB port. However, while such wireless devices may be able to communicate with a client computing device using such wireless protocols, these wireless devices may be unable to gain access to a virtual desktop application provided by the server. Thus, there is a need to overcome these deficiencies.

SUMMARY

In light of the foregoing background, the following presents a simplified summary of the present disclosure in order to provide a basic understanding of some aspects described herein. This summary is not an extensive overview, and is not intended to identify key or critical elements or to delineate the scope of the claims. The following summary merely presents various described aspects in a simplified form as a prelude to the more detailed description provided below.

In order to address the above shortcomings and additional benefits that will be realized upon reading the disclosure, aspects herein describe new methods and systems for transmitting data from a host computing device to a wireless device that is communicatively coupled to a client computing device.

Aspects herein describe at least a method, system, and computer readable storage media for transmitting data from a first computing device to one or more wireless devices that are communicatively coupled to a second computing device. The method, for example, comprises generating one or more first type of packets associated with an application stored in the memory of a first computing device. The method further comprises transmitting the first type of packets using an ICA (independent computing architecture) protocol from the first computing device to the second computing device, wherein the first type of packets are translated into one or more second type of packets at the second computing device, and wherein the second type of packets are transmitted to a wireless device of the one or more wireless devices that is communicatively coupled to the second computing device.

The various aspects of the illustrative embodiments are substantially shown in and/or described in connection with at least one of the following figures, as set forth more completely in the claims.

These and other advantages, aspects, and novel features of the present disclosure, as well as details of illustrated embodiments, thereof, will be more fully understood from the following description and drawings.

BRIEF DESCRIPTION OF THE DRAWINGS

Figure 1:
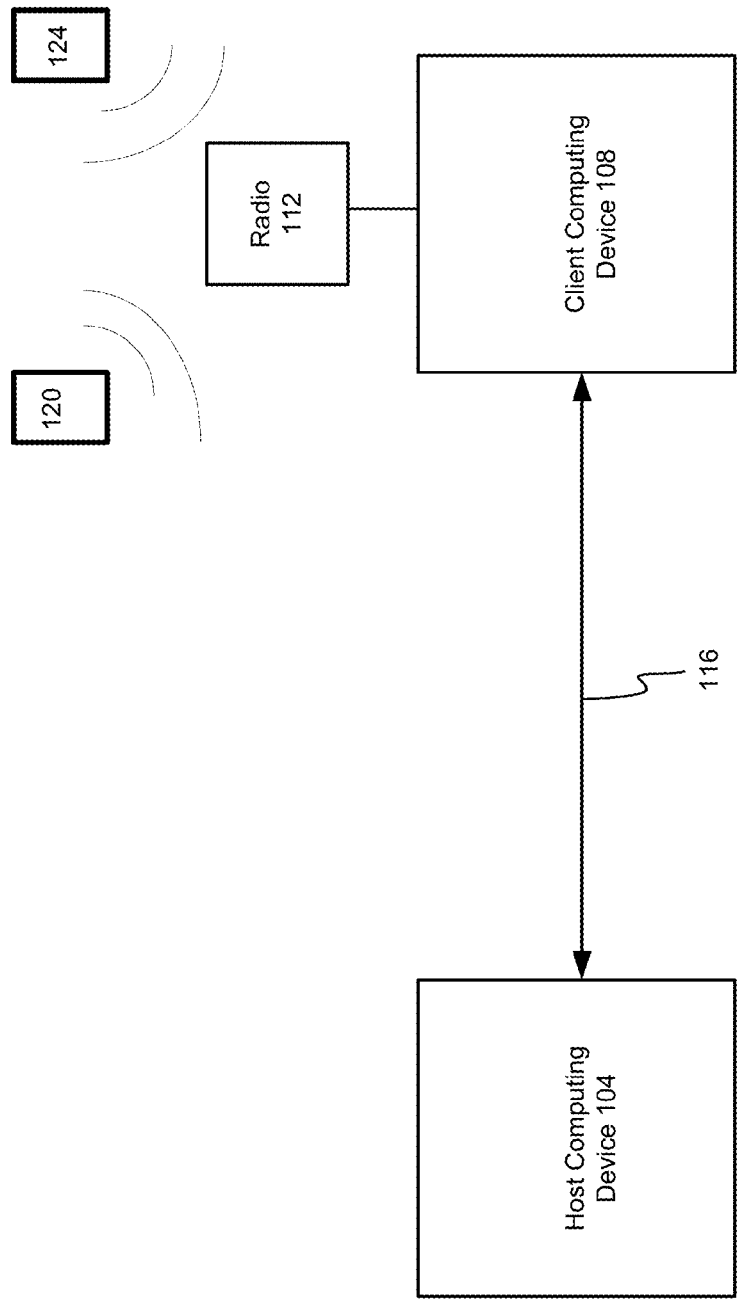

Having thus described aspects of the disclosure in general terms, reference will now be made to the accompanying drawings, which are not necessarily drawn to scale, and wherein:

FIG. 1 illustrates an operating environment in which various aspects of the disclosure may be implemented.

Figure 2A:
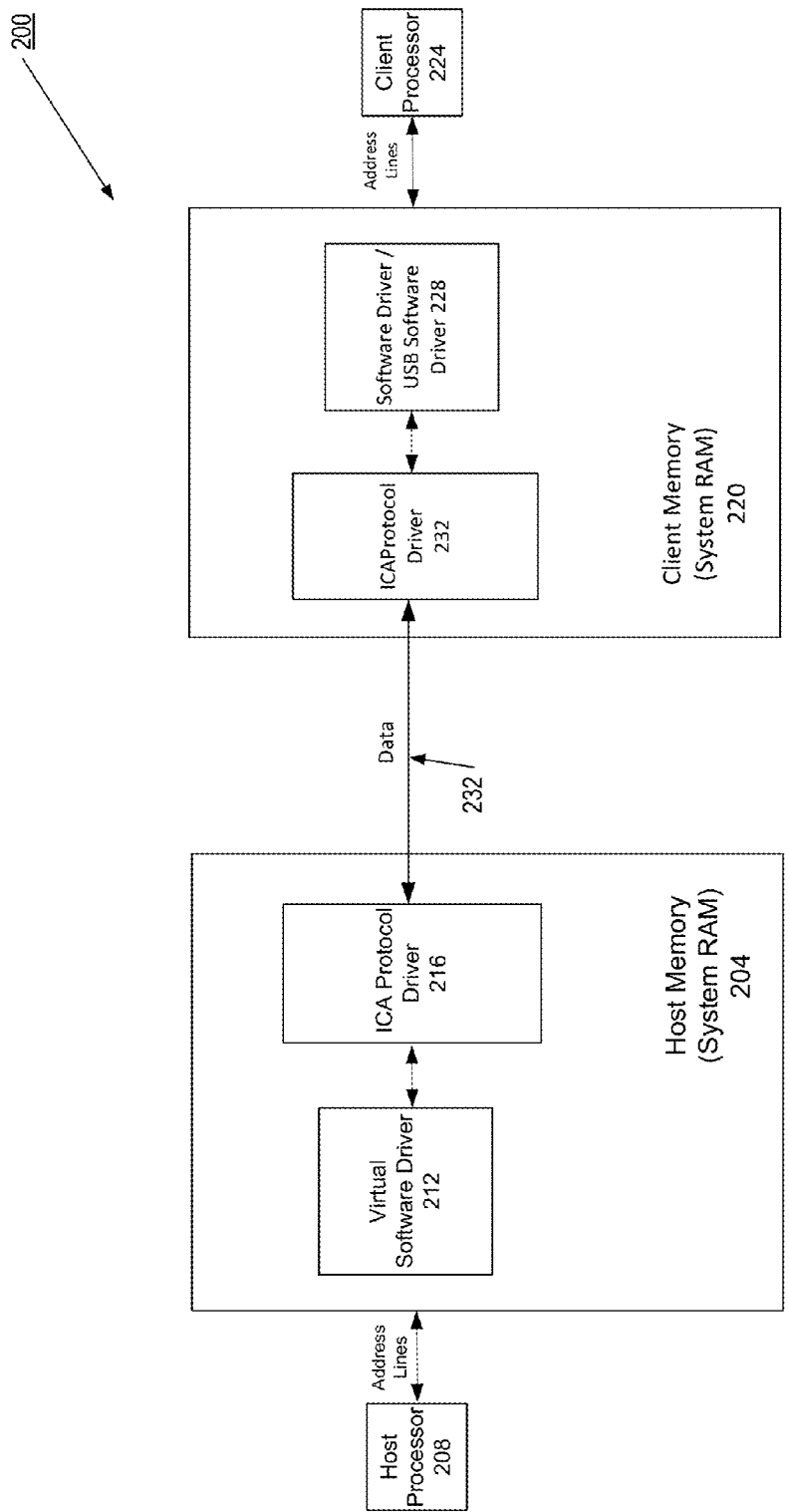

FIG. 2A is a system block diagram in which various aspects of the disclosure may be implemented.

Figure 2B:
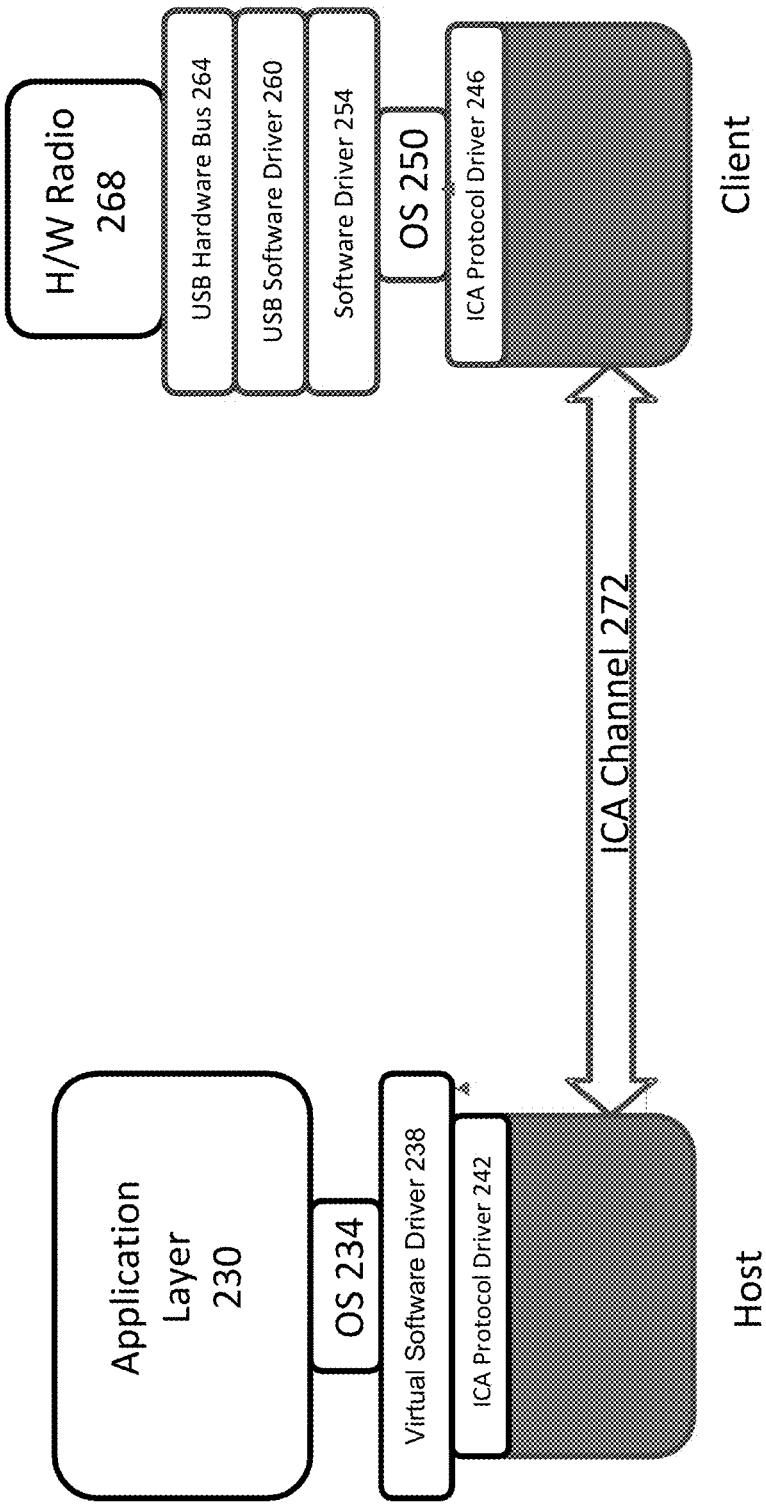

FIG. 2B is a relational block diagram of a software stack at the host computing device and a software stack at the client computing device in accordance with an embodiment of the disclosure.

Figure 3:
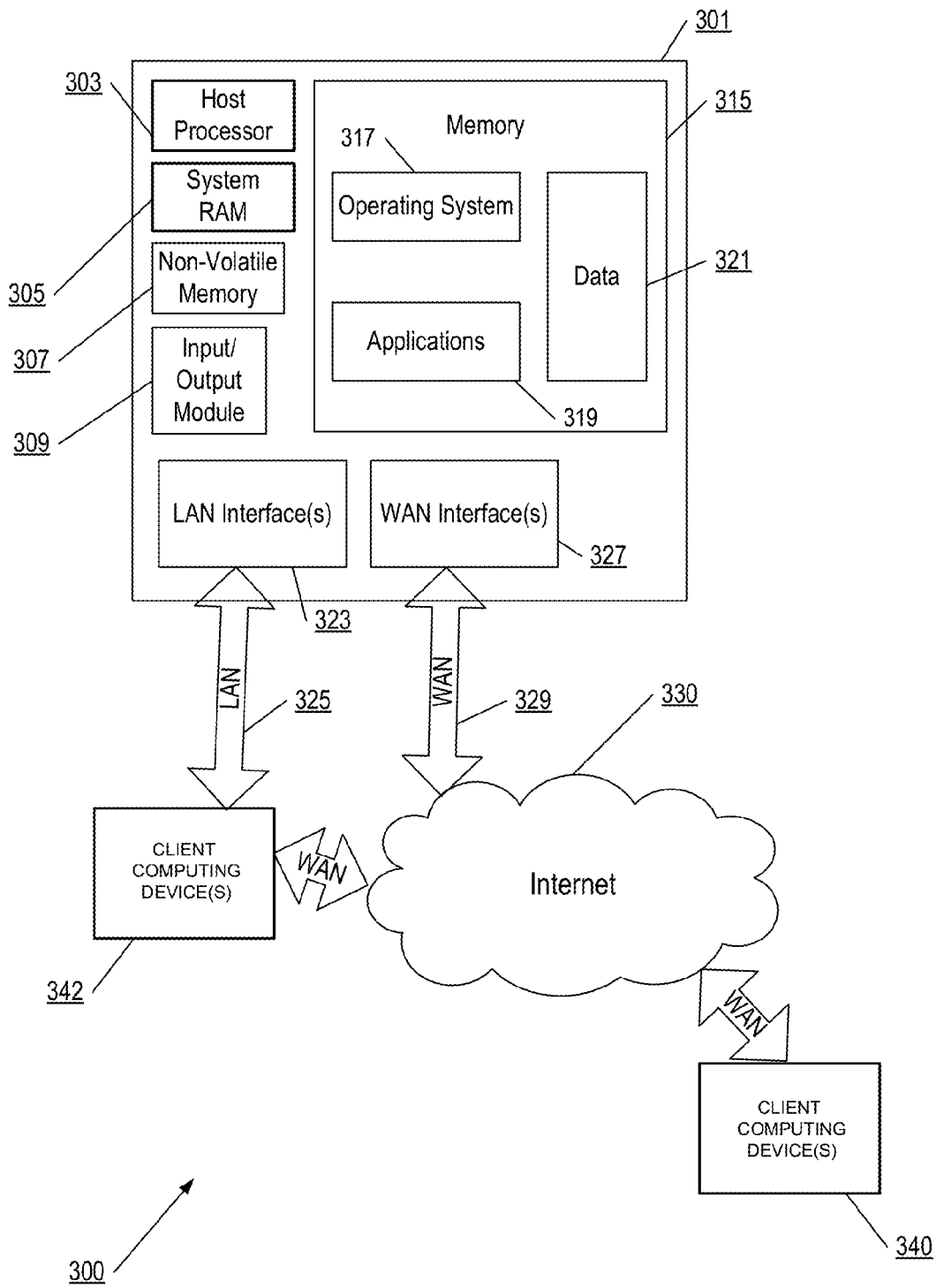

FIG. 3 illustrates a block diagram of a computing environment according to one or more embodiments of the disclosure.

Figure 4A:
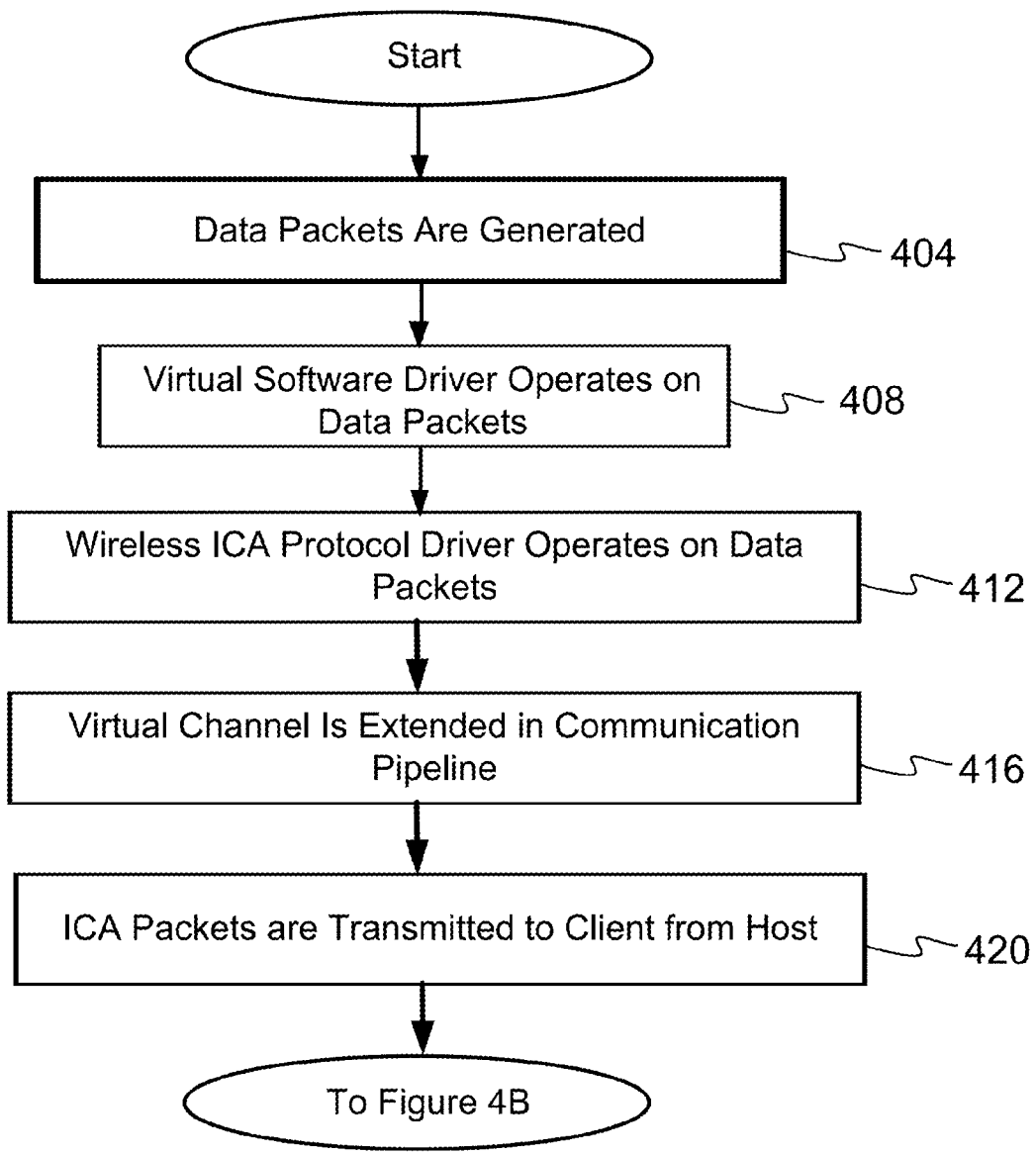

FIG. 4A is an operational flow diagram illustrating how a wireless application, such as a Bluetooth application executed by a host, transmits Bluetooth packets to a client.

Figure 4B:
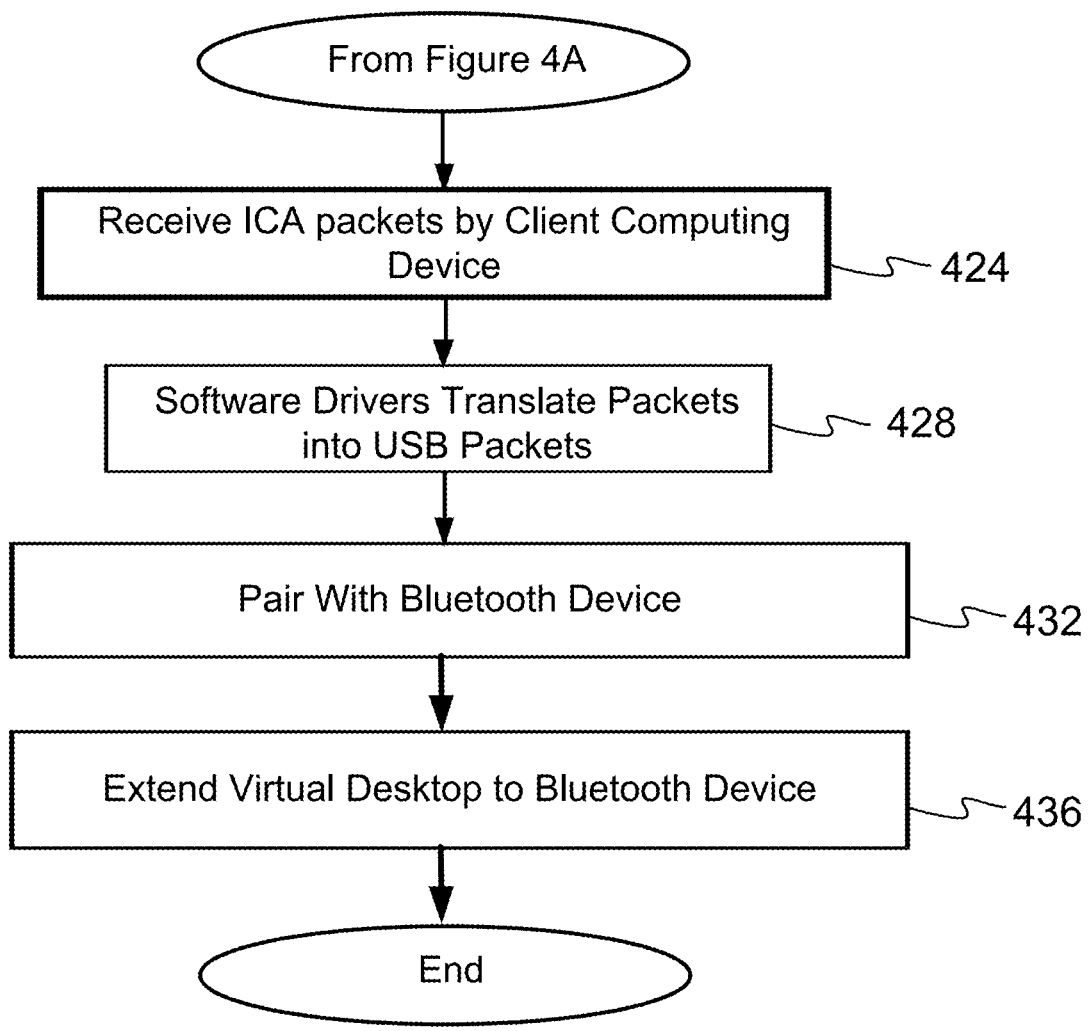

FIG. 4B is an operational flow diagram illustrating how data packets, such as Bluetooth packets are received from a host and used by a client in accordance with an embodiment of the disclosure.

DETAILED DESCRIPTION

In the following description of the various embodiments, reference is made to the accompanying drawings, which form a part hereof, and in which is shown by way of illustration various embodiments in which aspects described herein may be practiced. It is to be understood that other embodiments may be utilized and structural and functional modifications may be made without departing from the scope and spirit of the present disclosure.

Various aspects described herein may be embodied as a method, a data processing system or apparatus, or a computer program product. Accordingly, those aspects may take the form of an entirely hardware embodiment, an entirely software embodiment, or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including magnetic hard disk drives, optical discs such as CDs and DVDs, and/or other optical media or optical drives, NAS (network attached storage) devices, and/or any combination thereof. In addition, various signals, such as one or more digital signals, may comprise data (uncoded, coded, or encrypted) that may be transmitted between computing devices. The computing devices may comprise one or more computers (e.g., PC, desktop computer, laptop computer), one or more portable wireless computing devices (e.g., a wireless phone, PDA, laptop computer, notepad), or any kind of computing device comprising a processor and memory which is capable of executing firmware and/or software.

FIG. 1 illustrates an operating environment in which various aspects of the disclosure may be implemented. The operating environment includes a host computing device 104 and a client computing device 108. The host computing device 104 may transmit data to the client computing device 108 by way of a data communications link 116. The data may comprise any type of data. The data may comprise one or more applications, one or more commands, and multimedia data such as a movie, a slide show, a picture, or any other media, for example. The data may comprise one or more commands related to the discovery of devices, such as one or more wireless devices communicatively coupled to the client computing device 108. The wireless devices may communicate to the client using any wireless communications protocol, such as wireless personal area network (WPAN) protocol as specified in IEEE 802.15, Bluetooth protocol, near field communications (NFC) protocol, Wi-Fi protocol as specified in IEEE 802.11, or any other wireless protocol. In some aspects, the one or more applications may comprise an application that supports the discovery of wireless devices such WPAN devices, Bluetooth devices, Wi-Fi devices, and/or NFC devices. In some aspects, the one or more applications may provide control of the one or more discovered wireless devices. A user at the host may provide input for controlling the one or more discovered devices. The one or more commands may be transmitted to the one or more discovered devices through the data communications link 116 as a separate stream from the multimedia data. The communications channel used to transmit the one or more commands and the multimedia data, may comprise a dedicated proprietary communications channel.

The client computing device 108 may be communicatively coupled to a radio or transceiver 112. The radio or transceiver 112 may comprise a radio capable of communicating to one or more wireless devices. The radio or transceiver 112 may comprise a Bluetooth radio, for example. While the radio 112 may be implemented or incorporated into the client computing device 108, the radio 112 may comprise a connectable micro adapter dongle capable of receiving and transmitting packets wirelessly. The radio 112 may be connected to the client computing device 108 by way of a USB (Universal Serial Bus) connection, for example. The radio 112 may be connected to the client computing device 108 by way of a port at the client computing device 108. The USB connection may conform to any version of a wireless protocol used in communicating with the one or more wireless devices. The radio 112 may be communicatively coupled to one or more wireless devices 120, 124 by way of a wireless connection. The one or more devices 120, 124 may comprise a wireless phone, a notepad, a laptop, a capable video projector, and/or any other wireless device, for example. In one embodiment, the one or more devices 120, 124 may comprise one or more Bluetooth devices. The transmission link 116 may comprise a wired or wireless transmission link 116. For example, the transmission link 116 may comprise a packet switched data link and/or mobile communications wireless link or a combination thereof. The packet switch data link may comprise the Internet, for example. The host computing device 104 and client computing device 108 may be configured such that the data transmitted by the host computing device 104 may be transmitted to the one or more devices 120, 124. The one or more devices 120, 124 may comprise a laptop, screen projector, or any other wireless device capable of displaying any video data received by the client. In some aspects of the disclosure, desktop virtualization may be extended to one or more Bluetooth devices, for example.

The host computing device 104 may comprise a server while the client computing device 108 may comprise a thin client. The host computing device 104 may comprise a server that executes a thin-client application using a thin-client protocol to transmit data from the host computing device 104 to the client computing device 108.

While FIG. 1 illustrates a single client computing device 108, in other embodiments, the client computing device 108 may comprise a plurality of client computing devices in communication with the host computing device 104. Therefore, in some embodiments, the host computing device 104 may transmit the data to multiple client computing devices (not shown), each of which may be communicatively coupled to one or more radios. In some embodiments, the client computing device 108 may comprise a computer, a laptop, a wireless computing device such as a mobile phone or smart phone, for example. Each of the radios may be in wireless communication with one or more wireless devices. In such embodiments, the server may be capable of providing a virtual desktop to each of a plurality of devices.

FIG. 2A is a system block diagram in which various aspects of the disclosure may be implemented. FIG. 2A corresponds to an embodiment in which a first type of data packet is transmitted from the host and is translated or converted to a second type of data packet at a client. In one embodiment, the first type of data packet comprises a Bluetooth packet while the second type of data packet comprises a USB packet. Instead of translating the Bluetooth data to USB data at the host, the various aspects of the disclosure provide for transmitting the Bluetooth data to the client and translating the Bluetooth packets into USB packets at the client. The various aspects of the disclosure provide a way to increase the data transmission rate by postponing the translation of the Bluetooth data into USB packets until the Bluetooth packets are received at the client.

The system illustrated in FIG. 2A comprises a host memory 204 communicatively coupled to a host processor 208. The host memory 204 may comprise system RAM or main memory for storing data for use by the host processor 208. The host memory 204 may store data used to implement a virtual software driver 212 and an ICA (independent computing architecture) protocol driver 216. The ICA (independent computing architecture) protocol comprises a presentation layer protocol, e.g., available from Citrix Systems, Inc., of Ft. Lauderdale, Fla. The host processor 208 may execute data stored in the host memory 204 to invoke the virtual software driver 212 and the ICA protocol driver 216. The host memory 204 and the host processor 208 may be resident in the host computing device 104 previously described in connection with FIG. 1.

The system illustrated in FIG. 2A further comprises a client memory 220 communicatively coupled to a client processor 224. The client memory 220 may comprise system RAM or main memory to store data for use by the client processor 224. The client memory 220 may store data used to implement a software driver/USB software driver 228 and a ICA (independent computing architecture) protocol driver 232. The software driver may be supplied by a manufacturer of one or more wireless devices communicatively coupled to the client. The client processor 224 may execute data stored in the client memory 220 to invoke the software driver/USB software driver 228 and the ICA protocol driver 232. The client memory 220 and the client processor 224 may be resident in the client computing device 108 previously described in connection with FIG. 1.

The host processor 208 may execute data stored in the host memory 204 to invoke the virtual software driver 212. Instead of transmitting USB packets from the host, the virtual software driver 212 allows the host computing device to communicate data to the client computing device in its originally formatted packets. Aspects of the disclosure allow for the replacement of a USB software driver at the host computing device by the virtual software driver 212. By way of replacing the USB software driver with the virtual software driver, the data packets are transmitted from the host to the client without translating the data to USB data. At the client, the data may be translated into USB data for communication to the one or more wireless devices (which is connected to the client computing device by way of the radio). The client computing device translates the packets into USB packets. After being translated, the USB packets are transmitted to the one or more wireless devices by way of a radio at the client computing device.

Instead of translating the data packets into USB packets at the client and subsequently transmitting the USB packets through the data communications link 232, the data packets may be translated at the host; however in this instance, the effective data rate will suffer because the USB protocol inherently requires more commands and/or interaction relative to other protocols, such as the Bluetooth protocol. Therefore, the data packets are transmitted from the host and translated at the client. For example, Bluetooth data packets may be transmitted directly from the host to the client. As a consequence, the transmission of Bluetooth commands from the host to the client, for example, may be accomplished in a shorter time. Therefore, the effective transmission rate may be greater when transmitting Bluetooth data packets instead of USB data packets through the data communications link, for example. By eliminating the transmission of USB data packets over the data communications link 232, the effective transmission speed is improved and the host computing device may be able to enumerate the devices discovered at the client computing device. When USB data packets are transmitted, the first byte of a USB packet comprises a packet identifier (PID) byte followed by its bitwise complement. The 4-bit bitwise complement provides error detection; however, the use of such PID bytes provides a significant amount of redundancy in the transmission of USB commands. Furthermore, the use of USB packets requires the use of short cable lengths because of very short packet timeout thresholds. The redundancy associated with the USB protocol may have a negative effect on the effective data rate over the data communications link 232. Therefore, the translation of packets, such as Bluetooth packets into USB packets, may be postponed until the Bluetooth packets are received at the client.

Thus, based on the various aspects of the disclosure, the host may be able to discover the various wireless devices at the client and establish a channel in which data such as any multimedia data may be delivered from the host to one or more wireless devices. The multimedia data may comprise a movie or a presentation, for example.

In some aspects of the disclosure, Bluetooth wireless devices local to the client are controlled by way of host Bluetooth commands sent from the host computing device that are translated at the client computing device. In some aspects, translation of Bluetooth packets at the client may allow the host to discover Bluetooth devices that are in communication with the client computing device, thereby bridging an existing virtual desktop session provided at the client onto any of these Bluetooth devices. In some aspects, the virtual software driver 212 may comprise a Bluetooth virtual software driver and the ICA protocol drivers 216, 232 may comprise Bluetooth ICA protocol drivers. These drivers may be invoked by the host processor 208 as required or as needed to facilitate improvements in data communications between the host and the client, as well as the discovery and the enumeration of Bluetooth devices local to the client. For example, if the transmission of USB data between the host and the client is affected over a direct connection that does not use a proprietary presentation protocol, such as an ICA protocol, for example, the Bluetooth virtual software driver and the Bluetooth ICA protocol drivers may be invoked by the host processor 208 to facilitate the transmission of Bluetooth packets from the host to the client and as a result, a translation of the Bluetooth packets into USB packets may occur at the client.

Data packets may be transmitted from the host to the client by way of implementing a ICA virtual channel. In some aspects of the disclosure, the ICA protocol drivers 216, 232 provide a software communication interface by which the data packets may be transmitted from the host to the client. The ICA Protocol drivers 216, 232 facilitate the compression and decompression between the data packets and ICA protocol packets. The virtual channel communication pipeline between the host and the client may be extended to include the transmission of data packets, such as Bluetooth packets.

The system 200 may be resident in computing devices such as the host and client computing devices 104, 108 described in connection with FIG. 1. When executed by the client processor 224, the client memory 220 may store computer code or computer executable instructions that implement a Software Driver/USB Software Driver 228 and an ICA Protocol Driver 232. The client processor 224 may execute the computer code or computer executable instructions by way of addressing the client memory 220 using a plurality of address lines. The Software Driver and USB Software Driver 228 operate on the data received from the host. The data may comprise any type of data including commands as well as video data for display. The data may comprise one or more applications, a movie, a slide show, a picture, or any other media, for example.

FIG. 2B is a relational block diagram of a software stack at the host computing device and a software stack at the client computing device in accordance with an embodiment of the disclosure. As illustrated in FIG. 2B, the software stack at the host comprises a Bluetooth application layer 230, a host operating system (OS) layer 234, a virtual software driver layer 238, and a ICA (independent computer architecture) protocol driver 242. The software stack at the client comprises a USB hardware bus 264, a USB software driver 260, a software driver 254, a client operating system (OS) layer 250, and an ICA (independent computer architecture) protocol driver 246.

The application layer 230 may be associated with any type of application. The application may comprise a program which discovers and enumerates local Bluetooth devices that are within wireless range of the client, for example. The Bluetooth application may provide transmission of a multimedia presentation to the client, for example. The presentation may be transmitted to the client computing device's Bluetooth radio which may be communicatively coupled to any Bluetooth wireless device. The Bluetooth wireless device may comprise a video projector able to communicate using the Bluetooth protocol, for example. The operating system at the host 234 may differ from the operating system at the client 250. The virtual software driver 238 facilitates transmission of data originating from the application layer 230. The ICA protocol driver 242 may be used to encapsulate data packets, such as Bluetooth packets, for transmission using the ICA protocol. As illustrated in FIG. 2B, the data may be transmitted by way of the ICA channel 272 from the host to the client.

The ICA protocol driver 246 may be used to receive the ICA packets provided through the ICA channel 272. When Bluetooth packets are transmitted from the host and encapsulated by the ICA protocol driver 242, the ICA packets may be converted into Bluetooth packets by way of using the software driver 254. The Bluetooth packets may be translated into USB packets by way of using the USB software driver 260. The USB packets may be transmitted via the USB hardware bus 264 to the radio 268. The radio 268 wirelessly communicates to one or more wireless devices. The wireless devices may comprise Bluetooth appliances such as a video projector, for example (not shown).

FIG. 3 illustrates a block diagram of a computing environment 300 according to one or more embodiments of the disclosure. The computing environment 300 comprises a host computing device 301 (e.g., any computing device incorporating the use of at least one processor and at least one memory). The host computing device 301 may correspond to the host computing device 104 shown in connection with FIG. 1. According to one or more aspects, host computing device 301 may be a server in a single-server or multi-server desktop virtualization system (e.g., a cloud system) configured to provide virtual machines for client access devices. The host computing device 301 may have a host processor 303 for controlling overall operation of the server and its associated components, including random access memory (RAM) 305, non-volatile memory 307, input/output (I/O) module 309, and memory 315. The host processor 303 may be the same as the host processor 208 described in connection with FIG. 2.

I/O module 309 may include a mouse, keypad, touch screen, scanner, optical reader, and/or stylus (or other input device(s)) through which a user of host computing device 301 may provide input, and may also include one or more of a speaker for providing audio output and a video display device for providing textual, audiovisual, and/or graphical output. Software may be stored within memory 315 and/or other storage to provide instructions to host processor 303 for enabling host computing device 301 to perform various functions. For example, memory 315 may store software used by the host computing device 301, such as an operating system 317, application programs 319, and an associated database 321. Alternatively, some or all of the computer executable instructions for host computing device 301 may be embodied in firmware stored in the non-volatile memory 307. The non-volatile memory 307 may comprise read only memory (ROM), electrically erasable ROM, or flash memory, for example.

The host computing device 301 may implement the host computing device 104 shown in connection with FIG. 1, and may be communicatively coupled via one or more telecommunication connections to one or more computing client devices 340, 342. Each of the one or more client computing devices 340, 342 may comprise a thin client. A thin client may rely on the host computing device 301 to generate and deliver various applications. One or more of the client computing devices 340 may be accessed via the WAN while the other one or more client computing devices 342 may be accessed through a LAN. The client computing devices 340, 342, may comprise a desktop computer, a laptop, mobile communication device, or any digital appliance that comprises at least one processor and at least one memory. The one or more client computing devices 340, 342 may include many or all of the elements described above with respect to the host computing device 301. The network connections depicted in FIG. 3 include a local area network (LAN) 325 and a wide area network (WAN) 329, but may also include other networks (now shown). The host computing device 301 may be connected to the LAN 325 through a network interface or adapter 323. The host computing device 301 may include a modem 327 or other WAN network interface for establishing communications over the WAN 329, by way of the Internet 330. It will be appreciated that the network connections shown are illustrative and other means of establishing a communications link between the host computing device 301 and the one or more client computing devices 340, 342 may be used. Host computing device 301 and/or the one or more client computing devices 340, 342 may also comprise any type of portable wireless computing devices (e.g., mobile phones, smartphones, PDAs, notebooks, and the like). Each of the one or more client computing devices 340, 342 may be the same as the client computing device 108 described in connection with FIG. 1.

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Each of the one or more client devices 340, 342 may, in some embodiments, be referenced by any one of the following terms: client machine(s); client(s); client computer(s); client device(s); client computing device(s); local machine; remote machine; client node(s); endpoint(s); or endpoint node(s).

In one embodiment, each of the one or more client devices 340, 342 may comprise a virtual machine. The virtual machine may be any virtual machine, while in some embodiments the virtual machine may be any virtual machine managed by a hypervisor developed by Citrix Systems, IBM, VMware, or any other hypervisor. The hypervisor may be executed on the host computing device 301.

The client machine 340, for example, may execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

Still other embodiments include one or more client computing devices 340, 342 that display an application output generated by an application remotely executing on the host computing device 301. In these embodiments, the client computing devices 340, 342 may execute a virtual machine receiver program or application to display the video output using a client monitor in an application window, a browser, or other output window. In one example, the application is an application that generates a desktop view. A desktop view may include a graphical shell providing a user interface for an instance of an operating system in which local and/or remote applications can be integrated. Applications, as used herein, are programs that execute after an instance of an operating system (and, optionally, also the desktop) has been loaded.

The host computing device 301, in some embodiments, may execute a remote presentation client or other client or program that uses a thin-client or remote-display protocol to capture display output generated by an application executing on the host computing device 301 and transmits the application display output to the one or more remote client computing devices 340, 342. The thin-client or remote-display protocol can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

The host computing device 301, in some embodiments, may be any server type. In other embodiments, the host computing device 301 may be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server executing an active directory; or a server executing an application acceleration program that provides firewall functionality, application functionality, or load balancing functionality. Some embodiments include a host computing device 301 that receives requests from a client computing device 340, 342, forwards the request to a server (not shown), and responds to the request generated by the client device 340, 342 with a response from the second server. The host computing device 301 can acquire an enumeration of applications available to one of the client machines 340, 342 and well as address information associated with an application server (not shown). The host computing device 301 can then present a response to the client's request using a web interface, for example, and communicate directly with one or more of the client computing devices 340, 342 to provide the one or more client computing devices 340, 342 with access to an identified application. In a representative embodiment, the host computing device 301 may comprise one or more servers capable of processing one or more Bluetooth applications and transmitting Bluetooth data related to the one or more Bluetooth applications to the one or more client computing devices 340, 342.

The client computing devices 340, 342 may, in some embodiments, be a client node that seeks access to resources provided by the host computing device 301. In other embodiments, the host computing device 301 may provide client computing devices 340, 342 or client nodes with access to hosted resources. In addition to the host computing device 301, one or more servers (not shown), in some embodiments, may function as a master node such that the master node communicates with one or more of the client computing devices 340, 342. In some embodiments, the master node can identify and provide address information associated with a server (of the one or more servers) that hosts a requested application, to one or more of the client computing devices 340, 342. Yet, in other embodiments, the master node can be a server farm, a the one or more client computing devices 340, 342, a cluster of client nodes, or an appliance. The resources provided by the host computing device 301 may comprise any type of Bluetooth application which generates Bluetooth packets.

The host computing device 301 may transmit data over the Internet 330 to the clients 340, 342 as shown in FIG. 3. The WAN 329 and/or LAN 325 may comprise one or more sub-networks, and can be implemented using any combination of the client computing devices 340, 342, host computing device 301, digital appliances (not shown), and network devices (not shown) included within the computing environment 300. The Internet 330 may be implemented using any combination of the following network types: ATM (Asynchronous Transfer Mode); SONET (Synchronous Optical Network); SDH (Synchronous Digital Hierarchy); wireless; and/or wireline. The network topology of the WAN 329 and LAN 325 may differ within different embodiments, and possible network topologies include but are not limited to: a bus network topology; a star network topology; a ring network topology; a repeater-based network topology; or a tiered-star network topology. Additional embodiments may include mobile telephone networks that use a protocol to communicate among mobile devices, where the protocol may include, but is not limited to: AMPS; TDMA; CDMA; GSM; GPRS; UMTS; LTE; WiMAX; EDGE, or any other protocol capable of transmitting data among mobile devices.

FIG. 4A is an operational flow diagram illustrating how a wireless application, such as a Bluetooth application executed by a host, transmits Bluetooth packets to a client.

At step 404, data packets are generated by a host for transmission to a client. The packets may comprise any type of multimedia data. For example, the multimedia data may comprise a movie or a presentation. The packets may be generated by a Bluetooth application, for example. The host may execute a Bluetooth application that may provide remote discovery or enumeration of Bluetooth devices at the client, for example. For example, the Bluetooth application may provide command and control of the Bluetooth devices local to the client. The Bluetooth application may search and select a suitable Bluetooth device of one or more wireless devices to transmit the data to. The Bluetooth device may comprise a Bluetooth video projector, for example.

Next, at step 408, a virtual software driver operates on the data packets, such as Bluetooth packets, in preparation for transmission through an ICA communications channel. The virtual software driver interfaces with the ICA protocol driver.

Next at step 412, the ICA protocol driver may be used to encapsulate Bluetooth packets for transmission using the ICA protocol. The ICA protocol driver may establish a virtual communications channel between the host and the client.

At step 416, the virtual channel is extended to include data packets, such as Bluetooth packets for transmission within the virtual communications channel. Thereafter, at step 420, the data may be transmitted to the client by way of the ICA virtual communications channel. The ICA virtual communications channel may extend its capabilities to include the transmission of encapsulated Bluetooth packets.

FIG. 4B is an operational flow diagram illustrating how data packets, such as Bluetooth packets, are received from a host and used by a client in accordance with an embodiment of the disclosure.

The process continues with FIG. 4B, at step 424, where the ICA packets are received by the client computing device. The client computing device may utilize an ICA protocol driver to receive and translate the ICA packets.

At step 428, the Bluetooth and USB software drivers operate on the ICA packets to generate USB packets. The USB packets may be transmitted via the USB hardware bus to a radio.

Next, at step 432, the radio wirelessly communicates to one or more wireless devices and may perform pairing of the Bluetooth video projector. The pairing may occur between the host and/or client to the Bluetooth video projector based on control provided by a user at the host, for example. The control may be provided using Bluetooth commands provided by the host.

Thereafter, at step 436, the virtual desktop is extended to the one or more Bluetooth devices. For example, a Bluetooth appliance, such as the Bluetooth capable video projector, may be able to receive a video stream transmitted by the host and subsequently display the video stream onto a screen. Thus, a virtual connection may be established from the host computing device to a wireless device, such as a Bluetooth device by way of a client computing device. In other embodiments, the one or more wireless devices may comprise one or more wireless devices capable of communicating to the host by way of the client's radio using communications protocols comprising: wireless personal area network (WPAN), Bluetooth, near field communications (NFC), and/or Wi-Fi protocols, for example.

The foregoing presents a simplified summary of the disclosure in order to provide a basic understanding of some aspects. It is not intended to identify key or critical elements of the invention or to delineate the scope of the invention. Although not required, the various aspects described herein may be embodied as a method, a data processing system, or as a computer-readable medium for storing computer-executable instructions that are capable of being executed by a processor of a computer system. Aspects of the invention have been described in terms of illustrative embodiments thereof. Numerous other embodiments, modifications, and variations within the scope and spirit of the disclosed invention are possible from a review of this entire disclosure. For example, the steps illustrated in the illustrative figures may be performed in other than the recited order, and that one or more steps illustrated may be optional in accordance with aspects of the disclosure. Furthermore, for example, while the left channel video stream may be to obtain rate factors and SSIM indices for use on the right channel, it is contemplated that in other embodiments, the right channel video stream may be used to obtain rate factors and SSIM indices for use on the left channel. While some embodiments have been described with respect to specific examples, other embodiments include numerous variations and permutations of the above described systems and techniques.

Although the subject matter has been described in language specific to structural features and/or methodological acts, it is to be understood that the subject matter defined in the appended claims is not necessarily limited to the specific features or acts described above. Rather, the specific features and acts described above are disclosed as illustrative forms of implementing the claims.

What is claimed is:

1. A first computing device comprising:
at least one processor; and
memory storing computer executable instructions, wherein execution of said computer executable instructions by said at least one processor causes said first computing device to:
execute a virtual application configured to interact with a second computing device via a virtual session established with said second computing device and using an independent computing architecture (ICA) protocol;
generate, by said virtual application, one or more packets of a first type for a wireless device that is communicatively coupled to said second computing device; and
transmit said one or more packets of said first type using said ICA protocol to said second computing device, wherein, in response to receipt of said one or more packets of said first type at said second computing device, said second computing device translates said one or more packets of said first type into one or more packets of a second type and transmits said one or more packets of said second type to said wireless device.

2. The first computing device of claim 1, wherein said one or more packets of said first type comprise Bluetooth packets and said one or more packets of said second type comprise Universal Serial Bus (USB) packets, and wherein said wireless device is communicatively coupled to said second computing device by way of using a radio connected to said second computing device by a USB connection.

3. The first computing device of claim 1 wherein said wireless device comprises one of: a video projector, keyboard, and mouse.

4. The first computing device of claim 1 wherein said second computing device comprises a wireless communication device.

5. The first computing device of claim 4 wherein said wireless communication device comprises one of: a cellphone, laptop, netbook, and tablet.

6. The first computing device of claim 1 wherein said first computing device comprises a host and said second computing device comprises a thin client.

7. The first computing device of claim 1 wherein said one or more packets of said second type comprise USB packets, wherein said USB packets are transmitted to said wireless device by way of a USB bus resident in said second computing device.

8. A method comprising:
executing, at a first computing device, a virtual application configured to interact with a second computing device via a virtual session established with said second computing device and using an independent computing architecture (ICA) protocol;
generating, by said virtual application, one or more packets of a first type for a wireless device that is communicatively coupled to said second computing device; and
transmitting said one or more packets of said first type using said ICA protocol from said first computing device to said second computing device, wherein, in response to receipt of said one or more packets of said first type at said second computing device, said second computing device translates said one or more packets of said first type into one or more packets of a second type and transmits said one or more packets of said second type to the wireless device.

9. The method of claim 8, wherein said one or more packets of said first type comprise Bluetooth packets and said one or more packets of said second type comprise Universal Serial Bus (USB) packets, and wherein said wireless device is communicatively coupled to said second computing device by way of using a radio connected to said second computing device by a USB connection.

10. The method of claim 8 wherein said wireless device comprises one of: a video projector, keyboard, and mouse.

11. The method of claim 8 wherein said second computing device comprises a wireless communication device.

12. The method of claim 11 wherein said wireless communication device comprises one of: a cellphone, laptop, netbook, and tablet.

13. The method of claim 8 wherein said first computing device comprises a host and said second computing device comprises a thin client.

14. The method of claim 8 wherein said one or more packets of said second type comprise Universal Serial Bus (USB) packets, wherein said USB packets are transmitted to said wireless device by way of a USB bus resident in said second computing device.

15. A system comprising:
a first computing device and a second computing device;
wherein said first computing device comprises:
  at least one first processor; and
  memory storing instructions that, when executed by the at least one first processor, cause the first computing device to:
    execute a virtual application configured to interact with said second computing device via a virtual session established with said second computing device and using an independent computing architecture (ICA) protocol;
    generate, by said virtual application, one or more packets of a first type for a wireless device communicatively coupled to said second computing device; and
    transmit, to said second computing device, said one or more packets of said first type over an ICA channel; and
wherein said second computing device comprises:
  at least one second processor; and
  memory storing instructions that, when executed by said at least one second processor, cause said second computing device to:
    interact with said virtual application via said virtual session using said ICA protocol;
    receive said one or more packets of said first type transmitted through said ICA channel from said first computing device;
    translate said one or more packets of said first type into one or more packets of a second type; and
    transmit said one or more packets of said second type to said wireless device.

16. The system of claim 15, wherein said one or more packets of said first type comprise Bluetooth packets and said one or more packets of said second type comprise Universal Serial Bus (USB) packets, and wherein said wireless device is communicatively coupled to said second computing device by way of using a radio connected to said second computing device by a USB connection.

17. The system of claim 15 wherein said wireless device comprises one of: a video projector, keyboard, and mouse.

18. The system of claim 15 wherein said second computing device comprises a wireless communication device.

19. The system of claim 18 wherein said wireless communication device comprises one of: a cellphone, laptop, netbook, and tablet.

20. The system of claim 15 wherein said first computing device comprises a host and said second computing device comprises a thin client.

* * * * *